United States Patent [19]

Frisch

[11] 4,076,035

[45] Feb. 28, 1978

[54] VALVE CONSTRUCTION

[75] Inventor: Paul P. Frisch, Skokie, Ill.

[73] Assignee: Dayco Corporation, Dayton, Ohio

[21] Appl. No.: 752,486

[22] Filed: Dec. 20, 1976

[51] Int. Cl.² ............................................. F16K 1/22
[52] U.S. Cl. ................................... 137/601; 251/367
[58] Field of Search ............................ 137/512.1, 601;
251/305, 367; 137/599

[56] References Cited

U.S. PATENT DOCUMENTS

| 3,048,363 | 8/1962 | Garrigan | 251/367 X |
| 3,592,240 | 7/1971 | Hedrick | 137/601 X |

FOREIGN PATENT DOCUMENTS 781,036   2/1935   France .............................. 137/512.1

Primary Examiner—Robert G. Nilson
Attorney, Agent, or Firm—Reuben Wolk

[57] ABSTRACT

A butterfly valve construction is provided and has a valve body comprised of two roughly semicylindrical portions having open ends and such portions have their open ends detachably connected together to define a valve body as a pair of back-to-back roughly D-shaped portions and the D-shaped portions have a pair of valve members each rotatably mounted within an associated D-shaped portion with a device being provided for rotating the valve members to open and close same.

8 Claims, 3 Drawing Figures

VALVE CONSTRUCTION

BACKGROUND OF THE INVENTION

Valve constructions of large size, i.e., generally of the order of 10 feet and greater in diameter, have various applications in industry. Such large valves are often of the type commonly referred to as butterfly valves and such large valves are difficult to store, ship, and install economically. However, the valve industry is a highly competitive one whereby it is desirable to keep valve costs at a minimum without sacrificing the quality and reliability of each valve.

SUMMARY

It is a feature of this invention to provide a valve construction having a large size of the order mentioned above which is easily stored, shipped, and installed.

Another feature of this invention is to provide a valve of the character mentioned which may be installed economically.

Another feature of this invention is to provide a valve construction of the character mentioned which employs a pair of butterfly type valve members operating in a valve body of substantially circular peripheral outline.

Another feature of this invention is to provide a butterfly valve construction comprising a valve body comprised of two roughly semicylindrical portions having open ends and means connecting such open ends to define the valve body as a pair of back-to-back roughly D-shaped portions with a pair of valve members each rotatably mounted within an associated D-shaped portion, means being provided for rotating the valve members to open and close same.

Accordingly, it is an object of this invention to provide a valve construction having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
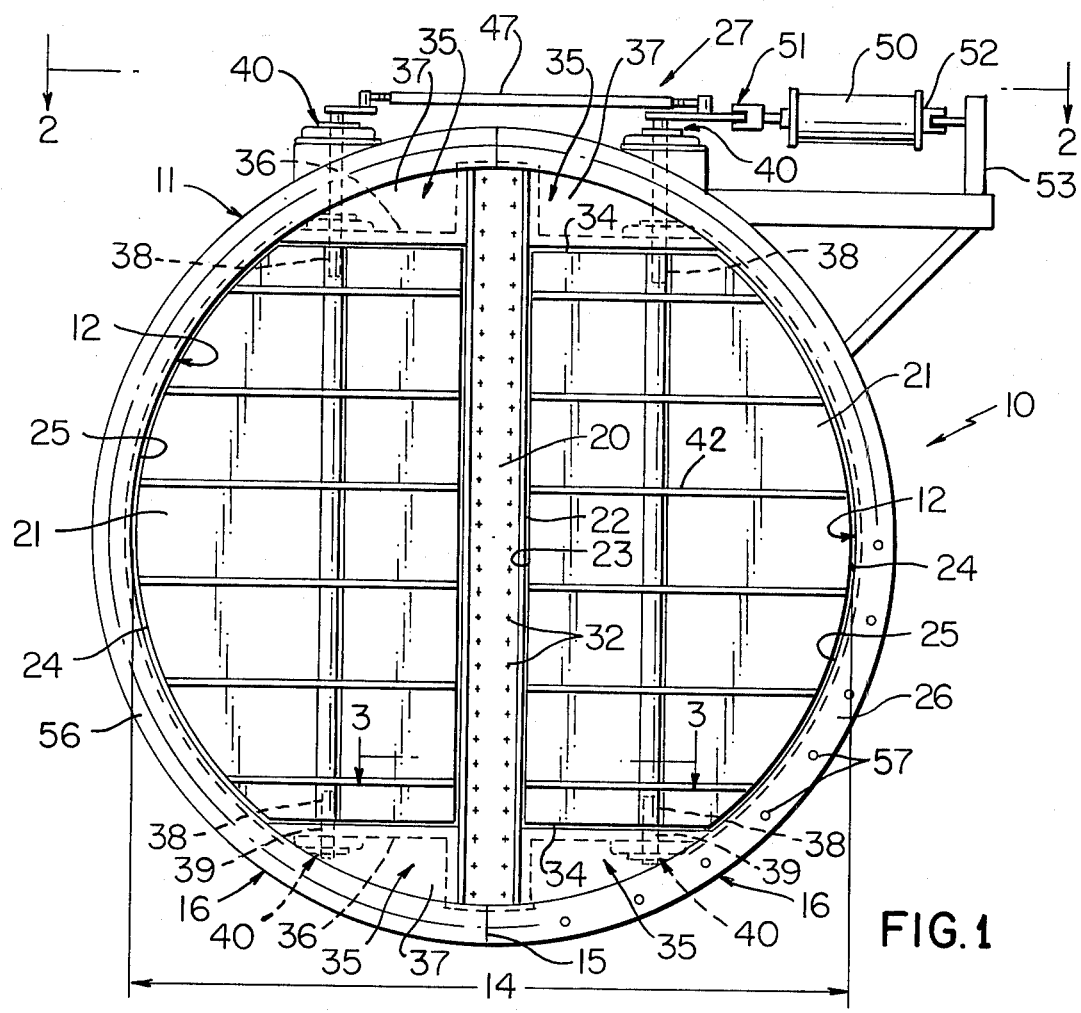
FIG. 1 is a view in elevation illustrating one exemplary embodiment of the valve construction of this invention which has a pair of butterfly valve members and illustrating such valve members in a closed position.

Reference is now made to FIG. 1 of the drawing which illustrates an exemplary embodiment of a dual valve member or dual blade butterfly valve construction of this invention which is designated generally by the reference numeral 10 and the valve construction is particularly adapted to be used in a comparatively large conduit such as conduit of circular cross section. In particular, the valve construction of this invention is of basically circular cross-sectional peripheral outline and is used in a conduit of circular outline which may range in size from less than 10 feet to as high as 30 feet in diameter and more whereby such valve may be considered generally of the order of 10 feet, and more.

Figure 2:
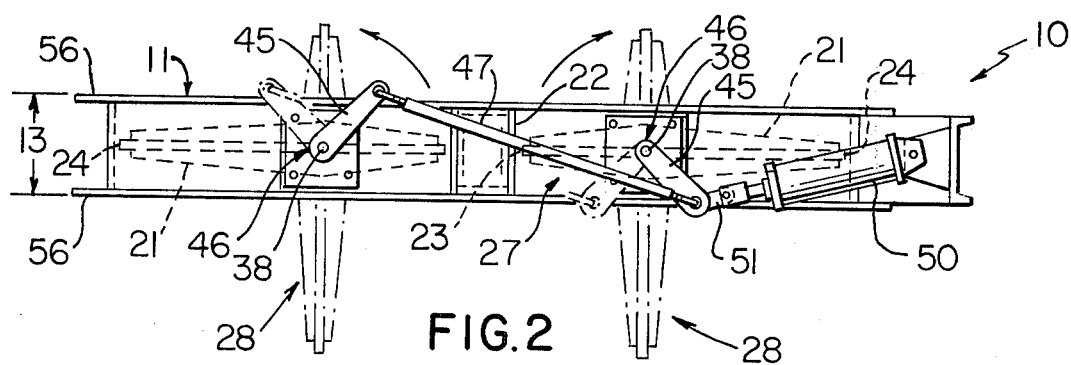
FIG. 2 is a view taken essentially on the line 2—2 of FIG. 1 also illustrating by dotted lines the valve members in a fully open position.

The valve construction 10 is comprised of a valve body 11 having two roughly semicylindrical portions each designated by the same reference numeral 12 and as seen in FIG. 2 such semicylindrical portions have a comparatively small axial height 13 when compared to the inside diameter of the valve construction 10. The semicylindrical portions 12 have open ends which abut on a plane indicated at 15 and the valve construction has means connecting such open ends to define the valve body as a pair of back-to-back D-shaped portions each designated by the same reference numeral 16. By making the valve body 11 of two portions, such as D-shaped portions 16, it will be appreciated that a comparatively large or jumbo valve construction 10 of the character mentioned may be made in two parts and such two parts are readily stored, shipped, and assembled to provide such valve at minimum cost.

The D-shaped portions or members 16 are substantially identical except they are reversed right and left. Further, it will be seen that the majority of the components in D-shaped portions 16 are interchangeable components whereby comparatively fewer different parts are required to be manufactured resulting in lower valve costs.

The valve construction 10 has means connecting the open ends of the D-shaped portions 16 together and such connecting means is designated generally by the reference numeral 20 and will be described in more detail subsequently. The valve construction 10 also has a pair of valve members each of which may be considered as a roughly D-shaped butterfly valve 21 and each valve member 21 is rotatably mounted within an associated D-shaped portion 16. The connecting means 20 defines one wall or surface 22 of the valve flow area against which an associated straight edge 23 of each D-shaped butterfly valve 21 moves in closing engagement; and a substantially curved edge portion defines the opposite edge 24 of each member 21 and with edge 24 moved in closing relation adjacent an inside surface portion 25 of the substantially semicylindrical surface 12.

The valve construction 10 also has means 27 for rotating the valve members 21 to open and close same. The rotating means 27 is in the form of an actuating mechanism 27 for opening and closing the valve members 21 from a fully closed position as illustrated in FIG. 1 to a fully open position as illustrated at 28 in FIG. 2; and, it will be appreciated that the actuating mechanism 27 may be employed to move the valve members 21 to any intermediate position, as desired.

Figure 3:
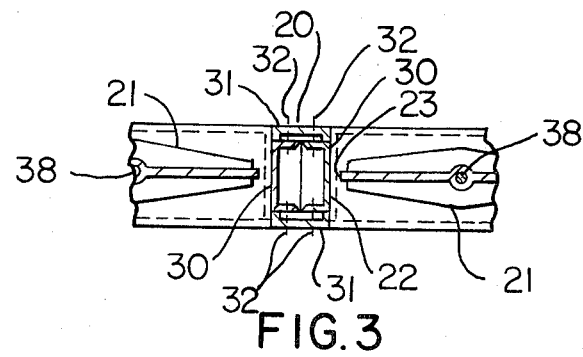
FIG. 3 is a fragmentary cross-sectional view taken essentially on the line 3—3 of FIG. 1.

The connecting means 20 for the D-shaped portions 16 in this example of the invention is in the form of a box-like assembly 20; and such box-like assembly is best seen in FIG. 3 and is comprised of a pair of U-shaped members each designated by the reference numeral 30 and each suitably connected with their open ends in abutting relation. Each bight of a member 30 is fixed to an associated semicylindrical portion 12 to define a D-shaped portion 16. The assembly 20 also has another pair of roughly U-shaped members 31 each fixed to the legs of the U-shaped members 30 and are suitably connected by fastening means 32 as indicated schematically by straight lines 32 extending through the components 30 and 31 in FIG. 3 and by plus-shaped markings also designated 32 in FIG. 1.

The valve members 21 in the illustration of FIG. 1 are in the form of D-shaped members each having a vertically disposed edge 22 and a rounded or curved edge 24. Each D-shaped valve member 21 also has rectilinear horizontally disposed opposite edges 34 arranged in parallel relation.

The valve construction 10 also has a pair of what will be referred to as barrier structures each designated by the same reference numeral 35 at opposite ends of each D-shaped portion 16 and each barrier structure is comprised of an L-shaped member 36 with at least one plate member 37 of roughly triangular outline supported by the L-shaped member 36. Each L-shaped member 36 has its outer end edges adjoining an associated semicylindrical surface 12 and it will be appreciated that the members 36 and 37 are suitably fixed in position using any suitable technique known in the art, such as welding, rivets, nuts and bolts, and the like. The barrier structures 35 decrease the effective flow area through the valve construction 10 at the top and bottom thereof and enable the utilization of the butterfly valve members 21.

Each valve member 21 has shaft means in the form of a pair of shaft portions or shafts 38 each having an inner end portion suitably fixed to an associated valve member 21 and each shaft 38 has an outer end portion 39 rotatably supported in an associated bearing means or assembly 40 detachably supported by an associated barrier structure 35. Accordingly, each valve member 21 is supported vertically by the shafts 38 at opposite ends thereof and bearing assemblies 40 provided in barrier structures 35.

Each valve member 21 has suitable strengthening means provided as a part thereof; and, in this example such strengthening means comprises strengthening ribs 42 which are disposed horizontally and in parallel relation.

As previously mentioned, the valve construction 10 has actuating means 27 for actuating the valve members 21, and as seen in FIG. 2 such actuating means comprises a pair of links 45 suitably fixed to terminal ends of end portions 39 of the shafts 38 provided at the top of each valve member 21 and as indicated at 46 in each instance and a link 47 interconnects the outer ends of the members 45. The link 47 is connected so that members 45 may rotate or pivot relative thereto. The actuating means further comprises an actuator device or actuator 50 having a force-applying end 51 capable of being telescoped in the usual manner with end 51 being suitably pivotally attached to the terminal end of one of the links 45. The opposite end 52 of the actuator 50 is supported by a frame structure 53 of valve construction 10. The actuator 50 may be powered by any suitable power source such as hydraulic, pneumatic, electrical, or combinations thereof. With this construction it will be appreciated that the valve members 21 may be rotated or actuated by the actuator 50 simultaneously to a fully closed position, to a fully open position, and to any intermediate position. The end portions 39 of the shafts 37 which are fixed at the top of each valve member 21 may be suitably rotatably supported by bearing means 40 carried by the valve construction 10 outwardly thereof.

The valve construction 10 of this invention may be used in all types of applications including low temperatures as low as $-65°$ F. to temperatures in excess of several thousand degrees F. In each instance suitable materials are used as determined by the intended application.

Each roughly semicylindrical portion 12 may be provided with flanges 56 at opposite end edges thereof and such flanges may be suitably fixed in position as by welding, or the like. The flanges 56 are provided with a plurality of equally spaced circular openings 57 therethrough for the purpose of fastening the valve construction in position within an associated conduit.

Because of the comparatively large size of the valve construction of this invention, such valve construction is made primarily of metallic materials specifically selected to provide reliable performance in the particular temperature environment. Further, instead of having a power-driven actuator 50 as the means for simultaneously rotating or actuating the valve members 21 suitable manual means may be provided for simultaneously actuating, i.e., opening and closing, the valve members 21. For example, handwheels, chainwheels, or the like may be provided.

While present exemplary embodiments of this invention, and methods of practicing the same, have been illustrated and described, it is to be understood that this invention may be otherwise variously embodied and practiced within the scope of the following claims.

What is claimed is:

1. A butterfly valve construction comprising, a valve body comprised of two roughly semicylindrical portions having open ends, means comprising a box-like assembly connecting said open ends to define said valve body as a pair of back-to-back roughly D-shaped portions, a pair of valve members each rotatably mounted within an associated D-shaped portion, a pair of barrier structures at opposite ends of each D-shaped portion adjoining said bar-like assembly, and means for rotating said valve members to open and close same.

2. A valve construction as set forth in claim 1 and further comprising shaft means for each of said valve members, each of said shaft means having inner end portions rotatably supported in associated barrier structures.

3. A valve construction as set forth in claim 2 in which said rotating means comprises a mechanical assembly operatively connected to said shaft means, and an actuator connected to said linkage assembly for moving same and thus rotating said shaft means and valve members simultaneously.

4. A valve construction as set forth in claim 3 in which each of said valve members has strengthening ribs defined as an integral part thereof.

5. A valve construction as set forth in claim 1 and further comprising a pair of mounting flanges adjoining opposite sides of each semicylindrical portion.

6. A valve construction as set forth in claim 5 in which the axial height of each semicylindrical portion and hence said valve body is a small fractional part of the diameter of said valve construction.

7. A valve construction as set forth in claim 1 in which each of said valve members has a substantially D-shaped peripheral outline.

8. A valve construction as set forth in claim 7 in which said box-like assembly is defined by two sets of U-shaped members, and said valve body has a roughly circular peripheral outline generally of the order of ten feet.

* * * * *